June 1, 1971     H. P. QUIRK     3,582,466
PAPER WEB SLITTER APPARATUS INCLUDING A LASER
AND LIGHT TRANSMISSIVE STRUCTURE
Filed July 9, 1968     2 Sheets-Sheet 1
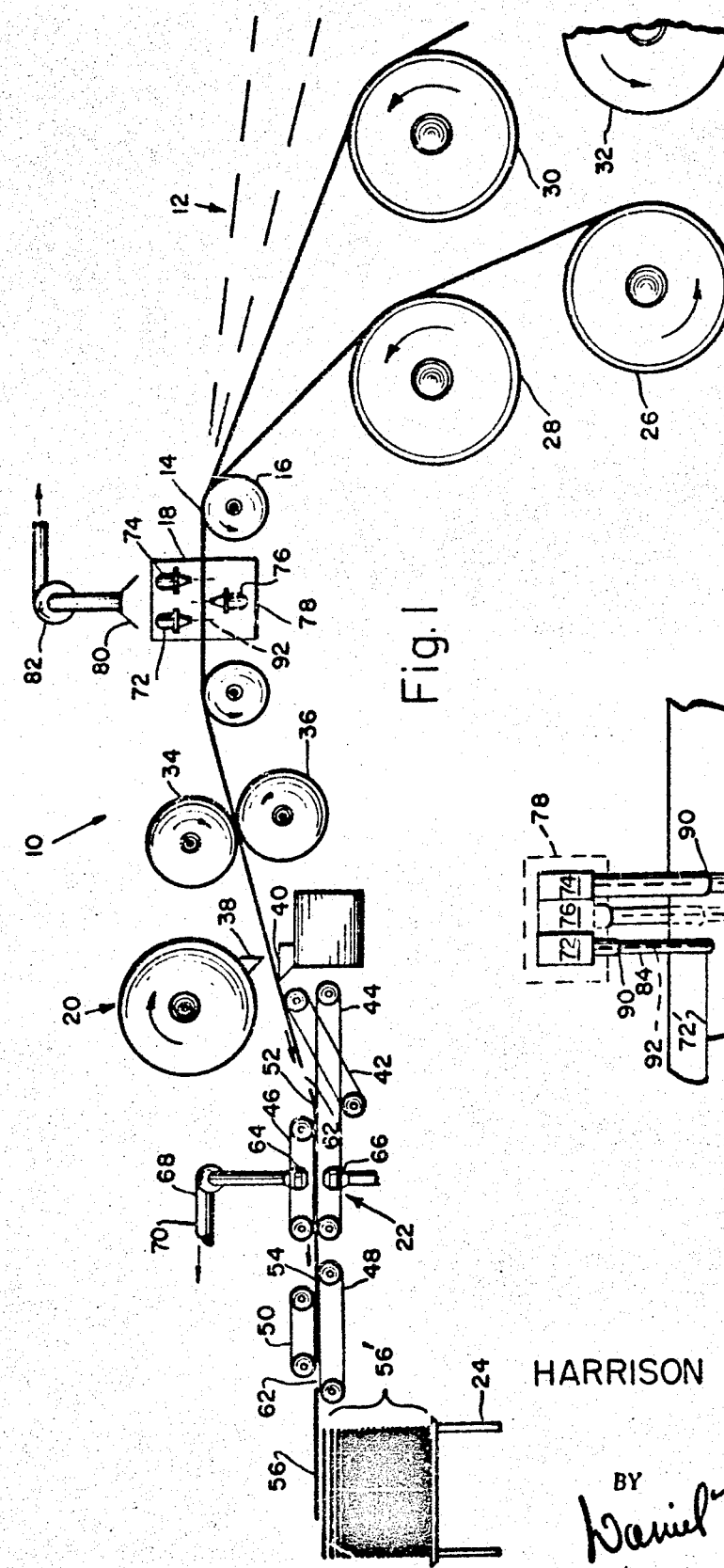
HARRISON P. QUIRK
INVENTOR.
BY Daniel T Anderson
ATTORNEY

HARRISON P. QUIRK
INVENTOR

BY Daniel T. Anderson
ATTORNEY

United States Patent Office 3,582,466
Patented June 1, 1971

3,582,466
PAPER WEB SLITTER APPARATUS INCLUDING A LASER AND LIGHT TRANSMISSIVE STRUCTURE
Harrison P. Quirk, 1942 Roosevelt, Ypsilanti, Mich. 48197
Filed July 9, 1968, Ser. No. 743,495
Int. Cl. B26f 1/30
U.S. Cl. 162—286
2 Claims

ABSTRACT OF THE DISCLOSURE

This specification discloses a system for longitudinally slitting, or trimming to width, a continuous, longitudinally moving web of paper. One or more laser output beams are utilized by means of periscope-like light transmissive and focusing structure extending transversely over the web to part the sheet as the latter tranverses the fixed path of the focused beam.

BACKGROUND OF INVENTION

(1) Field of the invention

The invention relates generally to paper dimensioning and more particularly to novel method and apparatus for slitting or trimming a continuous web thereof to predetermined width dimensions.

Although the invention finds particularly useful application in the field of trimming or slitting a continuous web of paper ahead of a sheeter mechanism for dimensionally fabricating rectangular sheets cut from the continuous web, and although in the cause of clarity and brevity of presentation herein, much of the following discussion and description of examples of the invention relate thereto, it is expressly to be understood that the advantages of the invention are equally well manifest in other paper cutting applications such as transverse sheetings, programmed combinations of longitudinal and transverse cutting, discontinuous perforation, and the like.

(2) Discussion of the prior art

In the modern paper manufacturing and supplying industry, it is a general practice to draw stock material from large rolls and prepare it for market needs in various respects including applying specified surface treatments, introducing chemical or coloring agents, and, as especially pertinent here, sizing or dimensioning the stock to prescribed sheet sizes or trimmed roll widths or the like. Typically, a continuous web of the stock material is drawn from a supply roll, or a plurality thereof, mounted on a backstand and passed through a slitter device to trim and/ or provide predetermined width dimensioning. The stock is then either rerolled or passed through a sheeting device for cutting the material to the described sheet length dimension. The sheeted stock may then be vacuum cleaned for cutter dust removal and stacked as by conventional layboy techniques.

The slitter mechanism is typically a peripherally sharpened disc type of knife pressed against the longtudinally traveling web which is backed by a roller member. The disc cutter and the backing cylinder both must rotate and must, accordingly, be mounted upon supporting structure which is of sufficient strength to provide a satisfactory degree of lateral placement stability while providing or permitting the necessary rotation to each member. The resultant inherent massiveness of the slitter mechanism limits the flexibility and ease of changing the width dimensioning and also limits the minimum spacing between adjacent slitter cuts; that is, the minimum sheet or web width. Furthermore, at best, the dimensional stability, due to such effects as vibration, of prior art slitters is compromised because of the requirements structurally for adjustability and versatility.

Additional disadvantages of conventional slitter devices include their extremenly critical requirements for constant sharpness with a precisely defined angle of knife edge coupled with a precisely sufficient, without excess, magnitude of force applied to the disc knife urging it just through the web and against the backing roller. To minimize downtime, an inventory of the significantly expensive sharpened knives must be maintained. The slitting process must typically be constantly monitored by skilled personnel to detect and correct for improper knife pressure, dull blades, dimensional error and the like. Furthermore the process of changing width or adjusting for different web thickness may require expensive down time and critical readjustment procedure before restart.

In addition, prior art slitters have a limitation in the maximum web speed that can be utilized due to effective angular velocity limits of the rotating machinery; and the maintenance of the rotating parts requires regular bearing inspection and lubrication. Sometimes also of significance is the fact that the rotating cutting machinery adds to the already deleteriously high ambient noise level of its environment.

A further problem area inherent with mechanical or knife type cutters and of severe, albeit subtle, consequences particularly in the field of producing expensive grades of high quality printing stock such as for use in greeting cards, menus, and the like, is the creation of cutter dust caused by paper fiber explosion when impacted by a high speed knife. The dust is particularly difficult to remove because it is extremely fine and once generated, it tends to permeate the entire environment of the slitting and sheeting and stacking operations. The cutter dust manifests itself as a problem during the subsequent printing of the papers: the dust gradually collects on the printers' roller platens causing a slow progressive degrading of printing and then accumulated masses of the material drops causing expensively wasteful destruction of the printing and of the high quality paper printing stock.

Accordingly, it is an object of the present invention to provide novel slitter method and apparatus which are not subject to these and other disadvantages and limitations of the prior art.

It is another object to provide such apparatus which does not require disc knives or other rotating slitter cutting mechanisms.

It is another object to provide such apparatus which does not depend upon knife sharpness, knife pressure, or any mechanical contact with the traveling web.

It is another object to provide such apparatus which does not require monitoring or maintenance by skilled personnel and which is exceedingly easily adjusted for different widths, thicknesses, and speeds of the traveling web.

It is another object to provide such apparatus which creates no cutter dust and has no mechanical limit in its speed or thickness of cut.

It is another object to provide such apparatus which is mechanically simple, rugged, reliable, quiet in operation, dimensionally stable, and which permits adjacent slitter cuts laterally spaced by an unlimited, narrow separation.

It is another object to provide such apparatus which may be readily programed to provide discontinuous slitting as in lineal perforations or the like and the cutting action of which does not depend upon water content, composition, color, finish or the like.

SUMMARY OF THE INVENTION

Very briefly, these and other objects are achieved in accordance with the structural aspects of one example of the invention which includes means for carrying a web, single or multisheet, past a slitter station. Mounted laterally contiguous to the traveling web at the slitter station is at least one laser adapted to project a high intensity light beam laterally over the surface of the paper parallel thereto within a hollow telescoping support tube arm. At the end of the arm a mirror is provided for reflecting the laser beam normal to the web at the lateral position desired for slitting or trimming. Lens means are provided along the laser beam of focusing it sharply in the web.

The power and duty cycle, if pulsed, of the laser generator output beam is selected to cut the desired web thickness and at the desired web speed. A force draft vented hood over the slitter station may be provided to remove fumes created by the laser cutting process.

Further details of these and other novel features of the invention and its operation including, for example, means for simultaneous multiple slitter cutting of the web and related sheeter structure as well as additional objects and advantages of the invention will become apparent and be best understood when considered in connection with the following description of the accompanying drawings which are presented by way of illustrative example only.

OUTLINE OF THE DRAWINGS

FIG. 1 is a schematic side elevtional diagram of paper slitter apparatus constructed in accordance with the principles and structural concepts of the present invention;

FIG. 2 is a plan view of a portion of the structure illustrated in FIG. 1;

DESCRIPTION OF PREFERRED EMBODIMENTS

Figure 4:
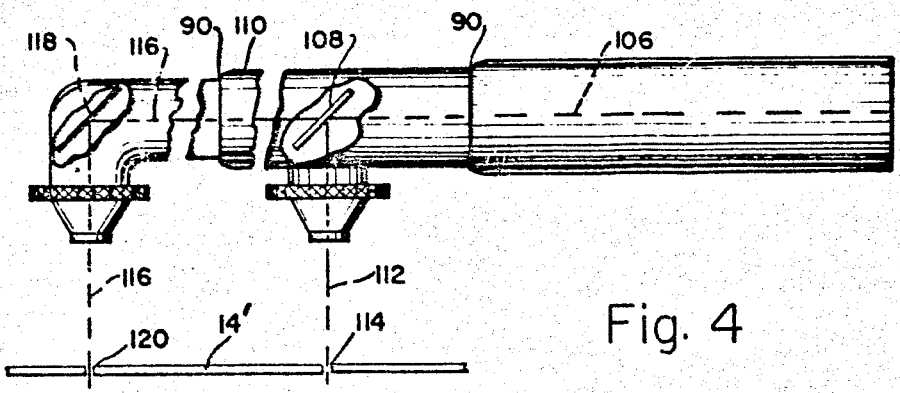
FIG. 4 is a similar view of an alternative example of the structure illustrated in FIG. 3.

With specific reference now to the separate figures in detail, it is stressed that the particulars shown are by way of example and for purposes of illustrative discussion only, and are presented in the cause of providing what is believed to be the most useful and readily understood description of the structural principles and method concepts of the invention. In this regard, no attempt is made to show structure of the apparatus in more detail than is necessary for a fundamental understanding of the invention. The description, taken with the drawing will make it apparent to those skilled in the paper making and modern electronic arts how the several forms of the invention may be embodied in practice. Specifically, in this regard, the detailed showing is not to be taken as a limitation upon the scope of the invention which is defined by the appended claims which are intended to form, along with the drawings, an integral part of this specification.

In FIG. 1, the example of the invention illustrated consists of a cutting system 10 for removing paper stock from an 8-roll, 4 only shown here, backstand assembly 12, forming it into an integral multisheet web 14 at the roller 16, slitting it at a slitter station 18, laterally cutting it at the sheeter assembly 20, carrying the sheeted web past a cleaning station 22, and stacking the cut sheets at a layboy stacking device 24.

In the figure, the backstand is of the character having its material drawn off the separate supply rolls 26, 28, 30, 32 by motive power applied to the driven rollers 34, 36 as indicated. The rotary sheeter knife 38 in cooperation with its stationary counterpart knife 40 are synchronized in the angular velocity of the knife 38 with respect to the linear velocity imparted to the web by the driven rollers 34, 36 to provide the desired longitudinal spacing of the lateral cuts and, thereby, the sheet length. A system of fabric, non-abrading tape carriers 42, 44, 46, 48, 50 convey the multisheet packets 52, 54, 56 of cut sheets at a somewhat higher velocity than that of the unsheeted web in order to provide gaps 62 between sequential ones of the packets. The gaps preclude interpacket edge interference and consequent sheet damage while providing clear access across the cut ends for vacuum cleaning by the juxtaposed vacuum headers 64, 66 to remove the aforementioned troublesome cutter dust by a current of air drawn by the blower 68 and exhausted as indicated along a duct 70.

At the slitter station 18, a plurality of laser generators 72, 74, 76 are shown mounted upon a housing body 78 and disposed below a fume collector 80 activated by an exhaust blower assembly 82.

As shown more clearly in the plan view of FIG. 2, the laser generators 72, 74, 76 are each optically coupled to the traveling web 14 through, in this example, a respective light transmissive tubular member 84, 86, 88 which "carries" its laser light beam laterally across the web to a mirror element, not shown in FIG. 2, which is supported at the outboard tip end of the tubular member for directing the laser beam in a direction normal to and toward the web surface.

As indicated, the tubualr members are length variable, by concentrically engaging telescopic means 90 in this example, for determining the lateral disposition of the respective longitudinal slitter lines 72', 74', 76'. In the example indicated, the slitter lines are laterally spaced from each other; however, it is to be noted that in accordance with the objects of versatility and flexibility of the present invention, the slitter lines may coincide as for purposes of greater depth of cut or speed of web or may be spaced laterally as little or as much as desired. Furthermore, by focus control of the beam, the slit width may be as sharpened or as spread as desired.

Figure 3:
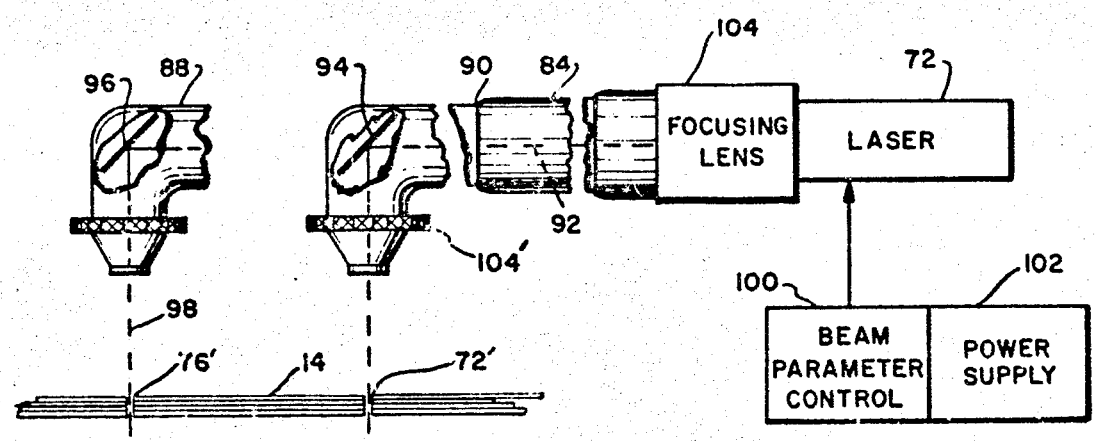
FIG. 3 is a more detailed view of a portion of the laser components of the example of FIG. 1.

Referring to FIG. 3, the side elevational and schematic view of one of the lasers 76 is illustrated in its relationship to its respective tubular light transmissive and mirror supporting tubular member 84. In this example, the laser beam 92 is directed from the laser 72 horizontally and laterally, with respect to the web 14, along the tubular member 84 to a mirror element 94 supported in the outboard tip end thereof and thence in a direction normal to the surface of the multisheet web whereupon the focused beam impinges upon the slitter line 72'.

The lateral disposition of the slitter line 72' is adjustably determined by the telescoping means 90 described above. Similarly, the laser cutter head portion of the tubular member 86, associated with the laser 76, not shown in FIG. 3, with its beam "bending" mirror element 96 housed in the outboard tip end thereof for transmitting the laser beam 98 to the slitter line 76'.

The laser generator 72 may be a $CO_2$ type of relatively high power output capability and may be continuous wave or pulsed as desired for optimizing or maximizing the paper cutting effects of output beam. Of course, when a discontinuous slitting result is desired, the laser is effectively, at least, pulsed to provide a duty cycle shaped and programed to achieve the desired pattern of discontinuous slitting. To this end, the laser beam parameter network 100 is shown coupled to the laser and its power supply 102 to control the beam intensity, duty cycle, repetition rate, and pulse shape and to provide any desired programing of beam output as a function of time.

The laser output beam is, in this example, focused and/or collimated by a lens assembly 104 and by additional focusing lens means 104' disposed at the output end of the beam transmissive tubular member 84.

Referring to FIG. 4, a portion of an alternative example of the invention is illustrated in which the output beam 106 from one of the laser generators is passed through a beam splitter 108 housed along the length of the telescopic tubular support member 110. The beam splitter reflects a first component 112, having a predetermined proportion of the beam energy, downwardly normal to the web 14' to a slitter line 114 and transmits a second component 116 onwardly to a mirror element 118 which reflects that second beam component downwardly to a slitter line 120 in the traveling web 14'.

Telescopic length varying means 90 may be provided as shown to provide desired flexibility in the lateral placement of the slitter lines 114, 120.

A further alternative example of the invention utilizes the beam splitter in its reciprocal role of combining the output beams of two or more lasers for greater material millage and web speed capabilities.

There have thus been disclosed and described a number of examples of structural and method aspects of novel paper web slitter apparatus which achieve the objects and exhibit the advantages set forth hereinabove.

I claim:
1. Paper web slitter apparatus of the character for at least partially parting, along a longitudinal direction, a continuous web of paper material traveling along that direction, the apparatus comprising:
   stock supply means from which said material may be drawn at production speeds;
   subsequent paper handling means;
   motive means for drawing said web of material from said stock supply means and carrying it along a predetermined path in said direction of traveling and toward said subsequent paper handling means;
   paper slitter means disposed contiguously to said predetermined path and including laser means for generating a light energy beam having a predetermined photon flow of magnitude sufficient to part said web;
   light path means for transmitting said beam from said laser means to said web and directing said beam normal to the surface thereof;
   beam focusing means interposed in said light path means for focusing said photon flow sharply onto said surface in web slitting relation thereto;
   electric control means coupled to said laser means for determining energy flow parameters of said beam;
   said light path means including light transmissive means comprising a laterally extending tubular member for receiving said beam from said laser and beam bending means for directing said beam into said direction normal to said web and toward said surface thereof;
   said laterally extending tubular member including length variable means for determining the lateral disposition of impact of the focused said beam upon said longitudinally traveling web; and
   beam splitter means interposed along said laterally extending tubular member for dividing said beam into a first beam component and directing it normal to and toward said web and a second beam component directed further along said light transmissive means toward said beam bending means.

2. Paper web slitter apparatus of the character for at least partially parting, along a longitudinal direction, a continuous web of paper material traveling along t rection, the appartus comprising.
   stock supply means from which said material n drawn at production speeds;
   subsequent paper handling means;
   motive means for drawing said web of material said stock supply means and carrying it along determined path in said direction of travelin toward said subsequent paper handling mea
   paper slitter means disposed contiguously to sai determined path and including laser means for ating a light energy beam having a predeter photon flow of magnitude sufficient to part sai
   light path means for transmitting said beam fro laser means to said web and directing said bea mal to the surface thereof;
   beam focusing means interposed in said light path for focusing said photon flow sharply onto sa face in web slitting relation thereto;
   electric control means coupled to said laser mea determining energy flow parameters of said
   said light path means including light transmissive comprising a laterally extending tubular memt receiving said beam from said laser and beam ing means for directing said beam into said dir normal to said web and toward said surface th
   said laterally extending tubular member including variable means for determining the lateral d tion of impact of the focused said beam upo longitudinally traveling web;
   said beam bending means comprising mirror mea receiving said beam from said laser and reflec toward said web surface, and said tubular m including means carried thereby for supportin mirror means at a predetermined distance fro laser means along said light transmissive mean
   said tubular member length variable means inc concentric element telescopically engaging app for effectively extending, to selected magnitud length of said laterally extending tubular mem

References Cited

UNITED STATES PATENTS

| | | | |
|---|---|---|---|
| 3,419,706 | 12/1968 | Lohrmann | 214— |
| 3,226,527 | 12/1965 | Harding | 219— |

S. LEON BASHORE, Primary Examiner

R. H. TUSHIN, Assistant Examiner

U.S. Cl. X.R.

19—121; 350—52